Figure 2:
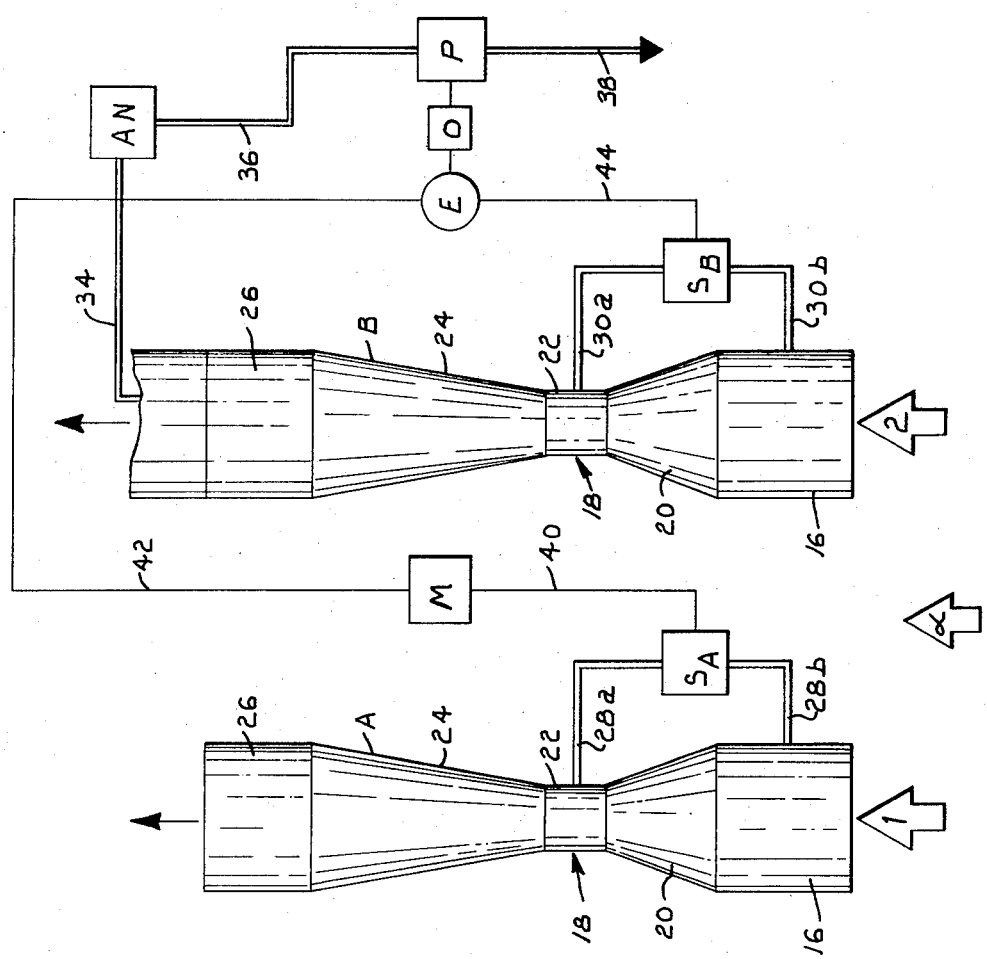

United States Patent [19]
Thompson et al.

[11] 3,866,475
[45] Feb. 18, 1975

[54] STACK SAMPLING METHOD AND APPARATUS

[76] Inventors: Stanley P. Thompson, 2718 Osborn, Topeka, Kans. 66614; Thomas B. Swearingen, 4326 Berini Dr., Durham, N.C. 27705

[22] Filed: Nov. 19, 1973

[21] Appl. No.: 416,927

[52] U.S. Cl............................................ 73/421.5 R
[51] Int. Cl. ............................................ G01n 1/22
[58] Field of Search............ 73/198, 422 R, 421.5 R, 73/421.5 A

[56] References Cited
UNITED STATES PATENTS

| | | | |
|---|---|---|---|
| 2,452,224 | 10/1948 | Collett, Jr. ...................... | 73/421.5 R |
| 2,794,909 | 2/1974 | Smith...................................... | 73/28 |
| 3,261,199 | 7/1966 | Raynor........................... | 73/421.5 R |

*Primary Examiner*—S. Clement Swisher
*Attorney, Agent, or Firm*—Lowe, Kokjer, Kircher, Wharton & Bowman

[57] ABSTRACT

A method and apparatus for achieving isokinetic sampling of a gas stream passing through a conduit, which method is independent of the local gas density. Side-by-side reference and sampling ducts are disposed within the conduit. The reference duct is open at both ends while the sampling duct is coupled with vacuum pumping apparatus and qualitative analysis instruments. Appropriate differential pressure sensing circuitry is coupled with each of the ducts to monitor the static pressure drop resulting from the flow of gas between two points in each duct. The differential pressure value is converted into an electrical signal and the signal originating from the reference duct circuitry is scaled by a factor of $(1/k)^2$. This scaled reference duct signal is then compared with the signal originating from the sampling duct circuitry to provide an electrical difference signal that is utilized to drive the vacuum pumping means. This assures that the velocity of gas entering into the sampling duct will always equal the velocity of the gas passing through the conduit and isokinetic sampling will therefore be achieved.

7 Claims, 2 Drawing Figures

STACK SAMPLING METHOD AND APPARATUS

This invention relates to sampling techniques generally and, more particularly, to a method and apparatus for isokinetically sampling a gas stream passing through a conduit.

The desirability of sampling a moving fluid stream under isokinetic flow conditions between the quantity being sampled and the remainder of the moving fluid body has long been recognized. Two of the earlier techniques, neither one of which actually achieved isokinetic sampling, are disclosed in U.S. Pat. Nos. 1,494,855 and 2,982,131 to MacMichael and Rosinski, respectively. The teachings of these prior art references will be discussed in greater detail hereinafter.

Current day sampling techniques are specified by the Environmental Protection Agency (EPA) of the federal government. In an effort to assure isokinetic sampling EPA techniques require a sampling probe to be moved across a stack to collect samples at various predetermined locations which are representative of area "zones" within the stack (as established by EPA for particular stack constructions). EPA specifications also call for a Pitot tube to be utilized to measure the local fluid stream velocity at each sampling location through measurement of pressure differentials and use of the formula:

$$Q = CA\sqrt{\Delta P/q} \tag{1}$$

where
- $Q$ = rate of fluid flow through the sampling duct
- $A$ = cross-sectional area of the sampling duct
- $C$ = flow constant dependent upon geometry of the sampling duct. C is known for certain duct constructions or can be determined by those skilled in the art.
- $q$ = fluid density
- $\Delta P$ = differential static pressure attributable to the flow of gas through the duct as measured by the Pitot tube.

As seen from equation (1), this equation cannot be solved until a value for $q$ is determined (which cannot be done using the Pitot tube). Thus prior to taking the Pitot tube measurement, an Orsat analysis and moisture content reading are taken to determine the value for $q$. This is an inherent disadvantage of the sampling technique since the solution of equation (1) is based on the assumption that the value for $q$ has not changed from the time $q$ was initially determined. Such an assumption is not necessarily accurate because of changing conditions within the stack.

Once equation (1) is solved and the value for q is determined, the sampling technician uses a chart listing what changes in $\Delta P$ need to be made to achieve isokinetic sampling. The vacuum pull through the sampling tube may then be increased to the level indicated by the chart to approach isokinetic sampling.

There are at least three inherent disadvantages in the foregoing described technique. These include the need to determine the value for q which is a complicated and time consuming procedure. Another disadvantage is the inherent inaccuracy of working with a value for $q$ which is assumed to remain constant during the sampling period but which may change. Still another disadvantage is the need to solve equation (1), above, to determine what pressure changes need to be effected in the sampling before a correction in favor of isokinetic conditions can be made.

The present invention solves the foregoing problems by providing controls on the sampling system which positively assure that the inlet velocity of the inlet stream through the sampling duct will always equal the local fluid stream velocity in the stack and hence isokinetic conditions will exist. This is accomplished automatically, independent of the density of the fluid stream ($q$) and without the need to solve equation (1) during the sampling procedure.

It is therefore an object of the present invention to provide a method and apparatus for sampling a moving fluid stream which is density independent and therefore avoids the time and complications involved in determining the density value.

As a corollary to the above object, it is an important aim of the invention to avoid the inaccuracy of working with a predetermined density value which is assumed to remain constant but is known to change under changing conditions.

Another one of the objectives of the invention is to avoid the necessity of solving a velocity equation prior to making corrections in the flow through the sampling duct thereby resulting in a method and apparatus which can sample more quickly and be operated by less skilled personnel.

As a corollary to the object next above, a further aim of the invention is to avoid the inaccuracy in sampling caused by a time delay, however slight, between solving a velocity equation and correcting the flow through the sampling tube as a result thereof.

Still another important aim of the invention is to provide a method and apparatus as described in the foregoing objectives which is compatible with existing analytical instrumentation as required for qualitative and quantitative analysis thereby permitting efficient integration with such instrumentation.

It is also an objective of this invention to provide a method and apparatus as described in the foregoing objects which provides for economical savings in time, equipment and personnel costs but with enhanced accuracy in isokinetically obtaining samples from a moving fluid stream.

Figure 1:
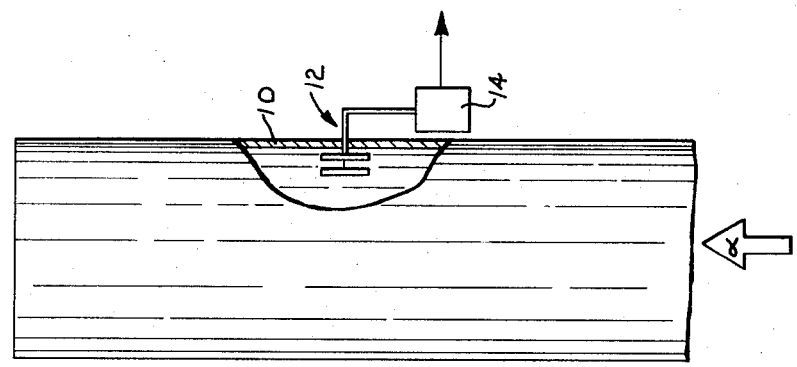

In the drawing:

FIG. 1 is an elevational view of a stack for directing a gas stream with a portion thereof broken away to illustrate the position of the sampling apparatus of the present invention; and FIG. 2 is a greatly enlarged elevational view of the sampling apparatus visible in FIG. 1.

The present invention is best understood with reference to the prior art devices such as shown in U.S. Pat. No. 1,494,855 mentioned above. This patentee utilized reference and sample ducts in a manner alleged to give accurate sampling. A diaphragm disposed in the reference duct of the patentee's apparatus has one side connected to the sampling duct while the other side is connected with the reference duct inlet. Movement of the diaphragm operates a throttle valve which in turn controls the flow of gas into the sampling duct. The patentee maintains that he measures the static pressure attributable to the flow through the two ducts and therefore continually and accurately corrects the flow through the sampling duct to equal the local fluid stream velocity in the stack.

This patentee's assertions regarding static pressure are incorrect. Static pressure is defined by *Perry's Chemical Engineers Handbook*, McGraw-Hill Publishing Company (1963), p. 5-5 as "the normal pressure on a stationary surface which parallels the flow." The above-referenced MacMichael patent does not measure the pressure on a stationary surface parallel to the flow but instead utilizes a diaphragm placed perpendicular to the flow. The measurement is therefore one of dynamic pressure attributable to the moving fluid and, contrary to the assertions of the patentee, the sampling with his apparatus would not be independent of variations in velocity, temperature, density, etc.

Another example of prior art techniques is shown in the above-referenced Rosinski patent. Here the patentee utilized parallel thermistors, one disposed inside the sampling duct and the other disposed in the fluid stream of the stack in which the sampling duct is located. By coupling the two thermistors together to yield an electrical difference signal, the flow through the sampling duct is kept in relatively close balance with the flow through the rest of the stack. Under ideal conditions, isokinetic sampling can be achieved. As a practical matter, factors other than velocity of the gas can cause changes in the heat transfer through the thermistor thus generating "correcting" signals when none should be given. For example, certain contaminants may effect a change in resistance of the gas without changing the fluid stream velocity.

A further inherent and extremely significant shortcoming of the device shown in the Rosinski patent is the need to make a separate velocity determination within the gas stack before the total flow of material can be determined regardless of how "isokinetically correct" the sampling technique is. The patentee discusses one technique for doing this. This introduces the possibility of further error and inaccuracy since the ultimate determination can only be as accurate as the velocity determination which is not made simultaneously with the sampling.

Referring now to the apparatus of the present invention which is shown in the drawing, a stack 10 is representative of any form of conduit through which a gas is flowing in the direction of the arrow identified with the symbol $\alpha$. The apparatus of the present invention is designated generally by the numeral 12 and includes side-by-side reference and sampling ducts A and B, respectively, which are coupled with control and analysis instrumentation designated generally by the numeral 14 and shown schematically only in FIG. 1.

Each of ducts A and B is constructed identical with the other duct and hence only one of the same will be described in detail. It is to be understood that like reference numerals on each of the ducts in the drawing indicate like components. Each duct has a generally cylindrical entryway 16 which communicates with a venturi section designated generally by the numeral 18. Venturi 18 includes an entrance cone 20, a throat 22 and a diverging pressure restoration cone 24. Venturi 18 merges into a cylindrical outlet section 26.

A differential pressure sensor $S_A$ is connected with duct A through lengths of tubing 28a and 28b and appropriate piezometer taps (not shown) in duct A.

Similarly, a differential pressure sensor $S_B$ is connected with duct B through lengths of tubing 30a and 30b as well as appropriate piezometer taps (not shown) in duct B.

The duct A is open at both ends of the unimpeded flow of gases therethrough while the duct B is open at one end only to receive a sample of the gases passing through stack 10. Duct B is coupled to quantitative and qualitative analysis instruments AN by a conduit 34. A second length of conduit 36 couples analyzer AN to a pumping station P. The analyzed product gas is discharged through a pump outlet 38.

The fluid stream velocity $V_{1A}$ through reference duct A in the direction of the arrow designated by the numeral 1 has a value somewhat less than the local fluid stream velocity $V\alpha$ through the stack in the direction of the arrow designated by the symbol $\alpha$ because of frictional losses through the duct. Thus, the following equation may be utilized to express $V_{1A}$:

$$V_{1A} = kV_\alpha \quad (2)$$

where
  $k$ = a constant dependent primarily upon duct geometry, and $$V_\alpha = V_{1A}/k. \quad (3)$$

The constant $k$ is the velocity coefficient relating ideal and actual flow and can be determined by those skilled in the art using known techniques.

From equation (3) it can be seen that if $V_{1B}$, the fluid stream velocity through duct B, could be made to equal $V_{1A}/k$, then $V_{1B}$ would also equal $V\alpha$ and isokinetic sampling through duct B could be achieved. The present invention involves the determination of the necessary relationship which must be present between $V_{1A}$ and $V_{1B}$ for there to be isokinetic sampling and the implementation of the necessary relationship into a practical working method and apparatus.

Starting from equation (1) it is seen that $$Q_A = C_A A_{1A} \sqrt{\Delta P_A/q} \quad (4)$$

and $$Q_B = C_B A_{1B} \sqrt{\Delta P_B/q} \quad (5)$$

Each of the symbols expressed in equations (4) and (5) are defined as for equation (1) given previously, except that they are specific for ducts A and B as indicated. It is also known that the flow rate through a duct can be expressed by the following simple formula:

$$Q = AV \quad (6)$$

where Q and A are defined as in equation (1) above and V represents the fluid stream velocity through the duct. As is readily apparent, the expression $C \sqrt{\Delta P/q}$ has been substituted for V in equation (1).

Utilizing equation (6), the two equations (4) and (5) above may each be set equal to equals as follows:

$$Q_A = C_A A_{1A} \sqrt{\Delta P_A/q_A} = A_{1A} V_{1A} \quad (7)$$

and $$Q_B = C_B A_{1B} \sqrt{\Delta P_B / q_B} = A_{1B} V_{1B} \quad (8)$$

Dividing equation (7) by equation (8) yields:

$$(9) \quad \frac{Q_A}{Q_B} = \frac{C_A A_{1A} \sqrt{\frac{\Delta P_A}{q_A}}}{C_B A_{1B} \sqrt{\frac{\Delta P_B}{q_B}}} = \frac{A_{1A} V_{1A}}{A_{1B} V_{1B}}$$

As explained previously, both $C_A$ and $C_B$ are constants dependent upon duct geometry which are known (or can be determined) for specific configurations or can be calculated by those skilled in the art. As will be apparent to anyone skilled in the art, whenever the construction of ducts A and B are such that their cross-sectional areas are in the same ratios, the constants $C_A$ and $C_B$ will be equal. This allows these two constants to be cancelled from equation (9) above. Also, since ducts A and B are disposed in close side-by-side relationship within stack 10, $q_A = q_B$. With the foregoing truisms, equation (9) may be simplified to:

$$\sqrt{\Delta P_A / \Delta P_B} = V_{1A} / V_{1B} \quad (10)$$

Squaring both sides gives:

$$\Delta P_A / \Delta P_B = V_{1A}^2 / V_{1B}^2 \quad (11)$$

Again recalling that the objective is to get $V_{1B} = V_{1A}/k = V\alpha$, and substituting $V_{1A}/k$ for $V_{1B}$ in equation (11) yields:

$$\Delta P_A / \Delta P_B = V_{1A}^2 / (V_{1A}/k)^2 \quad (12)$$

which may be simplified to:

$$\Delta P_A / \Delta P_B = k^2 \quad (13)$$

or $$\Delta P_B = (1/k)^2 \Delta P_A \quad (14)$$

Thus equation (14) expresses the relationship of the pressure differentials when $V_{1B} = V\alpha$ as desired, and likewise equation (14) may be substituted into equation (11) to determine the relationship between velocities when the pressures are related as in equation (14). Making this substitution gives:

$$V_{1B} = (1/k) V_{1A} \quad (15)$$

Returning to equation (3), it is also seen that $V_{1B}$ as expressed in equation (15) equals $V\alpha$. Thus, $V_{1B} = V\alpha$ when $\Delta P_A$ and $\Delta P_B$ are related in the manner expressed in equation (14).

As is inherent upon the passage of any fluid through a venturi, there will be a substantial pressure drop along the entrance cone 20. Thus the pressure drop is measured at two points located at opposite ends of the venturi cone 20. The first point is immediately ahead of cone 20 in entryway 16. The second point is following cone 20 along throat 22. The venturi, in addition to causing a substantial pressure drop also tends to "straighten out" the flow of gas and minimize swirling conditions which would adversely affect the pressure reading. The pressure drop $\Delta P_A$ is sensed by the differential pressure circuitry of the pressure sensitive device $S_A$. The pressure differential value is converted to an electrical signal which is carried by appropriate circuitry 40 to a multiplier shown schematically in FIG. 2 and designated by the letter M. Here, the signal emanating from $S_A$ is scaled by a factor directly proportional to $(1/k)^2$ to provide an electrical output signal which is carried by appropriate circuitry 42 to a Servo circuitry indicated schematically and designated by the letter E in FIG. 2.

Simultaneously with the foregoing described occurrences, pressure sensitive device $S_B$ is monitoring the static pressure drop attributable to the flow of gas through sampling duct B between two similarly located points as the points of detection in reference duct A. The pressure drop value measured by the device $S_B$ is converted into a second electrical signal which is relayed to Servo E by appropriate circuitry 44.

The Servo circuitry E compares the two electrical signals to provide an electrical difference signal which operates control circuitry O of the vacuum pumping apparatus P. Depending upon the signal received from Servo circuitry E, the vacuum pumping apparatus will operate with greater or lesser force to either increase or decrease the flow through sampling duct B until the velocity equals the velocity of the gas stream passing through stack 10 and Servo circuitry E no longer generates an "error" or difference signal.

Manifestly, a read-out can easily be provided at $S_B$ so that the differential pressure valve can be substituted into equation (1) to determine the actual flow rate through the sampling duct. A determination of density is easily made at the convenience of the operator by bleeding off a small amount of the gas passing through analyzer AN. It should also be appreciated that while it is preferable to construct ducts A and B with venturis 18 for the reasons stated above, it is possible to utilize other duct constructions without departing from the present invention.

Having thus described the invention, we claim:

1. Apparatus for achieving isokinetic sampling of a gas passing through a conduit, said apparatus comprising:
   a reference duct positioned in said conduit,
   said reference duct being open at opposite ends for the unimpeded flow of gas therethrough;
   a sampling duct disposed adjacent said reference duct within said conduit,
   said reference and sampling ducts having like flow constants (c) and a velocity coefficient (k);
   vacuum pumping means coupled with said sampling duct for causing the flow of gas therethrough;
   first pressure sensitive means for monitoring the pressure drop between two points in said reference duct and converting the pressure drop value into a first electrical signal;

second pressure sensitive means for monitoring the pressure drop between two points in said sampling duct and converting the pressure drop value into a second electrical signal;

means for scaling the first electrical signal by a factor directly proportional to $(1/k)^2$ to provide an electrical output signal; and means for comparing the second electrical signal with the electrical output signal to provide an electrical difference signal;

said vacuum pumping means being operable in response to said electrical difference signal to cause the velocity of the gas passing through the sampling duct to equal the velocity of the gas passing through the conduit.

2. The invention of claim 1, wherein each of said reference and sampling ducts includes a venturi section, said two points in each duct being located on opposite ends of the venturi entrance cone.

3. The invention of claim 2, wherein said two points in each of said ducts are located, respectively, ahead of the venturi entrance cone and at the venturi throat.

4. The invention of claim 1, wherein said reference and sampling ducts are disposed within said conduit in aligned side-by-side relationship.

5. The invention of claim 1, wherein said reference and sampling ducts are of identical geometric configuration.

6. A method of isokinetically sampling a gas passing through a conduit having adjacent sampling and reference ducts, said ducts characterized by like flow constants $(c)$ and a velocity coefficient $(k)$, said reference duct being open at opposite ends for the unimpeded flow of gas therethrough and said sampling duct being coupled with vacuum pumping apparatus, said method comprising the steps of:

moving a first quantity of said gas through said sampling duct;

moving a second quantity of said gas through said reference duct by operation of said vacuum pumping apparatus;

monitoring the static pressure drop attributable to the flow of gas between two points in said reference duct and converting the pressure drop value into a first electrical signal;

monitoring the static pressure drop attributable to the flow of gas between two points in said sampling duct and converting the pressure drop value into a second electrical signal;

scaling the first electrical signal by a factor directly proportional to $(1/k)^2$ to provide an electrical output signal;

comparing the value of the second electrical signal with the value of the output signal to provide an electrical difference signal; and driving said vacuum pumping apparatus with said difference signal to cause the second electrical signal to equal the scaled first electrical signal.

7. A method as set forth in claim 6, wherein each of said reference and sampling ducts includes a venturi section, and each of the two monitoring steps comprises monitoring the pressure drop in the respective ducts between a first point ahead of the venturi cone and a second point at the venturi throat.

* * * * *